Nov. 14, 1972  D. B. MOORE  3,702,708

QUICK CONNECT LUGGED COUPLING

Filed Aug. 28, 1970  2 Sheets-Sheet 1

INVENTOR
DONALD B. MOORE
BY Whittemore, Hulbert
& Belknap

United States Patent Office 3,702,708
Patented Nov. 14, 1972

3,702,708
QUICK CONNECT LUGGED COUPLING
Donald B. Moore, Pontiac, Mich., assignor to Locking Devices, Inc., Pontiac, Mich.
Filed Aug. 28, 1970, Ser. No. 67,776
Int. Cl. F16l 37/24
U.S. Cl. 285—87     5 Claims

ABSTRACT OF THE DISCLOSURE

The coupling includes male and female elements which are secured together by means of lugs on the male element which extend through notches to be received in a groove in the female element. An interior surface of the groove is provided with a movable protuberance and a fixed protuberance which assure proper rotation of the elements when engaged and provide a stop for the lugs. The movable protuberance is spring-biased. The lugs have camming faces on the leading edges to cam the movable protuberance out of the way when the elements are turned in one direction to thereby permit coupling of the device.

BACKGROUND OF THE INVENTION

Couplings of the type to which the present invention is directed are utilized for a variety of purposes. The coupling is particularly directed to uses where it is desired to have a quick connect and disconnect. For example, in pneumatic or hydraulic control systems it is frequently desired to change the control lines. The control lines may be connected to a board forming part of a central source of fluid under pressure. In the past, threaded fastener devices have frequently been used for such applications. When a large number of connections are made, the time consumed in threading the connectors into and out of the board has been lengthy. Additionally, threaded openings aways present a problem in connection with sealing the connection fluid-tight.

A similar problem exists in connection with electrical connections. Jacks have been commonly used in the past. However, jacks do not provide a locked connection and a connection made by use of a jack may inadvertently be opened.

In co-pending application Ser. No. 816,739, filed Apr. 16, 1969, and now abandoned, a coupling is disclosed which is capable of being quickly connected in secure, fluid-tight engagement. The coupling therein disclosed is not positively locked in the coupled position. The present invention provides a modified version of this coupling which is capable of being positively locked in the coupled condition but which is also capable, depending upon the design consideration, of being modified so as not to be positively locked in the coupled condition.

SUMMARY OF THE INVENTION

The coupling comprises a male element and a female element. The male element comprises a body having at least one lug extending laterally therefrom. The lug includes an angled leading face. The female element comprises a body including means defining an opening having a notch configured to receive one end of the male element with the lug received in the notch. These means have a groove therein adjacent to said opening and of larger diameter than the opening. The groove and opening define a lip. A first movable protuberance is provided having at least a portion extending into the groove. Said means have an opening permitting movement of the protuberance out of the groove. Resilient means are provided to bias the protuberance into the groove. The protuberance extends into the groove a distance sufficient to make pressure contact with the lug upon insertion of the male element into the female element and relative turning of the elements whereby the angled leading face will cammingly engage the protuberance and move the protuberance against the action of the resilient means to permit passage of the lug thereby. A second fixed protuberance is provided in the groove spaced from the first protuberance and extending into the groove a distance sufficient to act as a stop when contacted by the lug upon further turning thereof.

Figure 1:
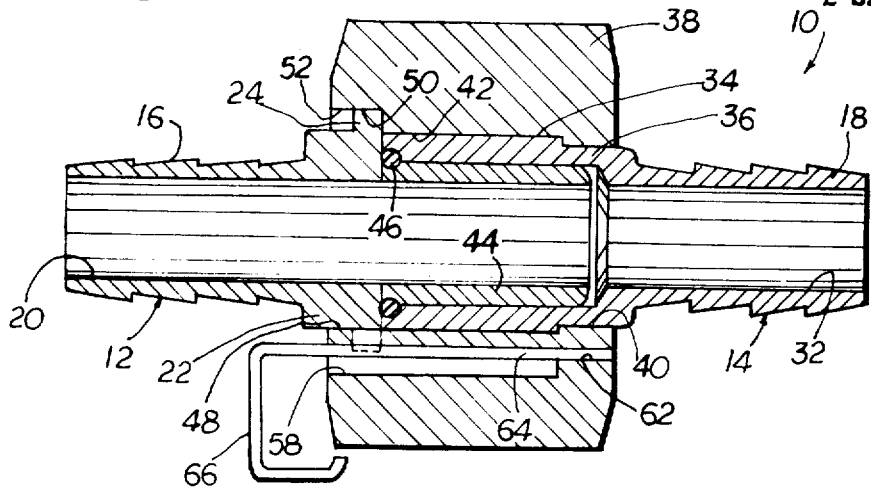
FIG. 1 is a sectional view of a quick connect lugged coupling in the coupled condition forming one embodiment of the present invention.
Figure 2:
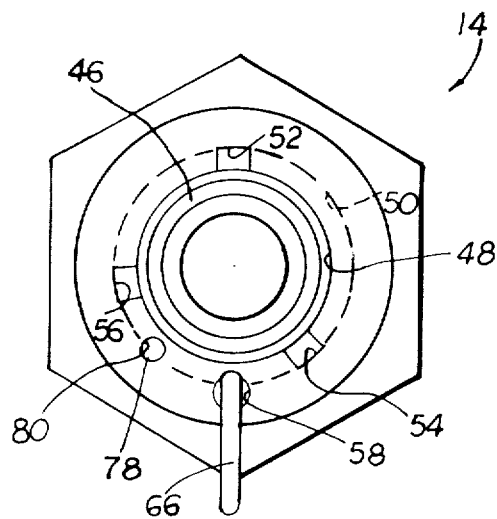
FIG. 2 is an end view of the female coupling element of FIG. 1 viewed from the left.
Figure 3:
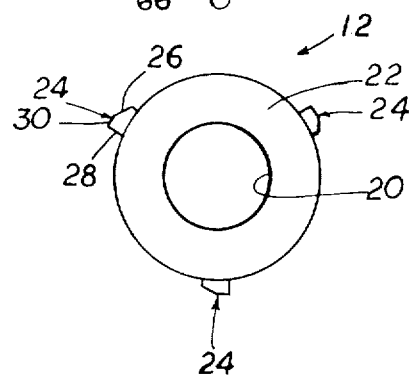
FIG. 3 is an end view of the male coupling element of FIG. 1 viewed from the right.

Referring to FIGS. 1–3, the coupling generally indicated at 10 comprises a male element 12 and a female element 14. These members have a coupled position as illusrated in FIG. 1 wherein they are locked together and an uncoupled position wherein they are separated. The elements 12, 14 are tubular elements and each has a serrated outwardly projecting portion 16, 18 to lockingly receive a flexible line fabricated of, for example, rubber or plastic. As will be appreciated, the configuration of the portions 16, 18 may be altered as desired for connection to other structures. For example, the coupling structure may be used for fluid connections, electrical connections, and mechanical connections.

The male element 12 is an elongated tubular body having a central bore 20 for the flow of fluid, for example, gaseous or liquid refrigerant in a refrigeration system. An enlarged head 22 is provided on one end. A plurality of lugs 24, illustratively three in number, project radially outwardly from the enlarged head 22 and are positioned at the forward end thereof. The lugs 24 are equally spaced around the periphery of the head 22. The leading portion of each lug has an angled face or surface 26. The surface 26 extends from a point adjacent to the outer periphery of the head 22 forwardly at an angle towards the trailing edge 28. The trailing edge surface is at substantially right angles to the outermost lug surface 30.

The female element 14, which also comprises a tubular body has a central bore 32 for the flow of fluid therethrough. An enlarged head is provided at one end of the female member 14. The head includes stepped diameter portions 34, 36, portion 34 being of larger diameter than the portion 36. A wrench engageable element 38 is received on the enlarged head. The element 38 has a central bore therethrough. The bore includes a small diameter portion 40 which is received on the head portion 36 and a larger diameter portion 42 which is received on the head portion 34. This arrangement secures the element 38 in place but permits rotation thereof with respect to the body of the female element.

A cup-shaped element 44 is received in the end of the female element. Adjacent peripheral groove portions are provided on the inner surface of the enlarged head portion 34 and outer surface of the element 44 to receive an O-ring 46.

The element 38 has an opening 48 which is of substantially equal diameter to the diameter of the enlarged head 22 of the male element to snugly receive this element when the parts are coupled. An enlarged groove 50 is provided immediately adjacent to the opening 48. The diameter of the groove 50 is larger than the diameter of the opening 48 by an amount equal to twice the length of one of the lugs 24.

A plurality of spaced apart notches 52, 54, 56 extend radially outwardly from the opening 48. The notches are of a size and are so positioned to permit entry of the lugs 24 through the opening 48 and into the groove 50. When the male element is inserted, it seats against the O-ring 46 in sealing engagement therewith.

An axially extending opening 58 is provided in the outer marginal portion of the element 38 a short distance in the clockwise direction from the notch 54. The opening 58 extends to a point approximately even with the bottom of the bore portion 42, leaving a thickness equal to the depth of the bore portion 40. The opening 58, which has a circular configuration, intersects the bottom of the groove 50 thus defining a passage providing communication between the space in the groove 50 and the opening 58.

A second smaller axially extending opening 62 having a center slightly radially inwardly from the bottom of the groove 50 extends entirely through the element 38. A J-shaped spring 63 comprising an elongated leg 64 and a hook-shaped outer portion 66 is provided. The leg 64 extends through the opening 62. The end portion of the leg 64 is snugly engaged by that portion of the opening 62 which extends beyond the opening 58. A space is defined between the remaining portion of the leg 64 and the wall surface of the opening 58. This permits radially outward flexing of the remaining portion of the leg 64. As will be noted, a portion of the leg 64 projects into the groove 50. A second rod 78 is received in axially extending opening 80 positioned a short distance in the clockwise direction from the opening 62. The rod 78 is fixedly secured in the opening 80 and, as will be noted, a portion extends into the groove 50. This portion serves as a stop element.

Operation of the device may now be understood. When it is wished to connect the male element 12 to the female element 14, the lugs 24 on the forward portion of the male element are aligned with the notches 52, 54, 56 of the female element. The male element is then inserted until the lugs 24 are received in the groove 50. The male element is then turned in the clockwise direction. When the angled surface 26 of the lug which is adjacent the spring 63 contacts the leg 64, the leg 64, as a result of the camming action, will be sprung radially outwardly. After the lug has passed by the spring, the leg 64 will spring back into its initial position. This effectively locks the male and female elements together because upon a reverse turn of the male element, the flat surface 28 will contact the leg 64. However, the leg 64 will not be cammed out of the way because of the angle of the surface 28. The surface 28 may be angled to provide an undercut portion to more firmly engage the leg 64. However, it should not be angled outwardly unless it is desired not to have a positive stop in the counter-clockwise direction. When the male element is turned further in the clockwise direction, the surface 26 will contact the rod 78. However, the rod 78 will not be cammed out of the way because it is fixed and therefore the lug will be positively locked between the leg 64 and the rod 78 thus preventing undesired disengagement of the male and female elements. When it is desired to disengage these elements, the hook portion 66 of the spring may be manually engaged to pull the spring out of the way thus permitting uncoupling of the elements.

Figure 5:
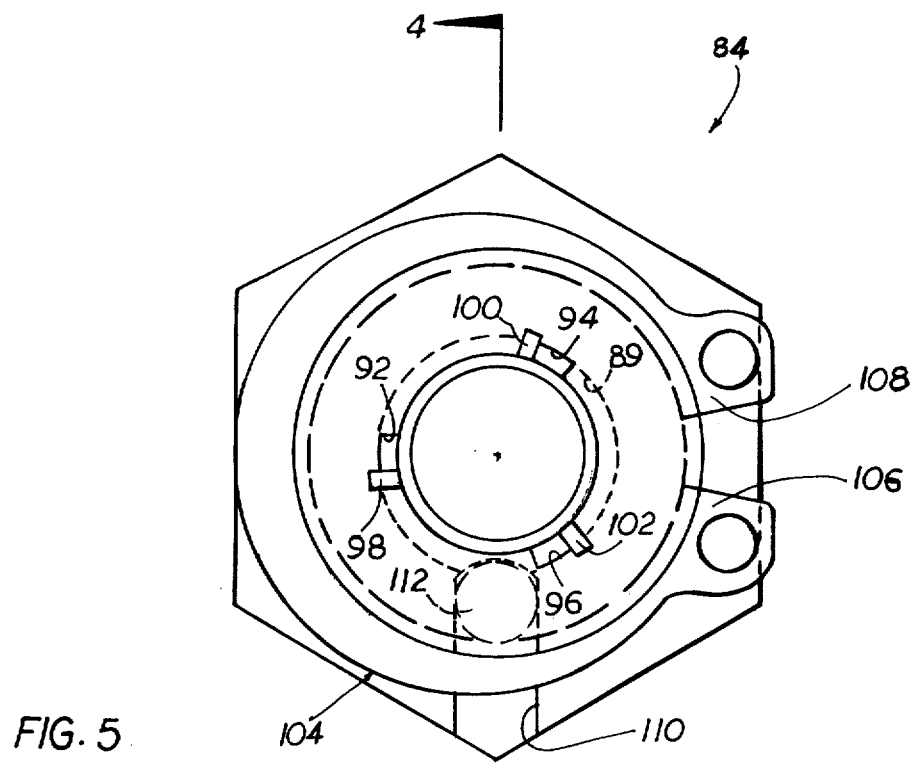
FIG. 5 is an end view of the female coupling element of FIG. 4 viewed from the top.
Figure 4:
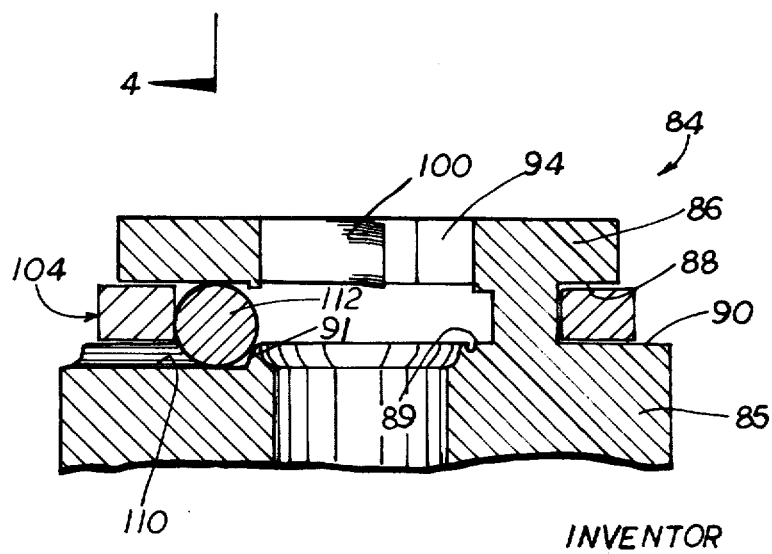
FIG. 4 is a sectional view of the end portion of the female coupling element of a quick connect lugged coupling forming another embodiment of the present invention taken substantially along the line 4—4 of FIG. 5.

FIGS. 4 and 5 illustrate another embodiment of the invention. Only the female element 84 is illustrated, the male element being substantially identical to the male element 12 previously described. The female element includes a tubular body 85 having a forwardly projecting portion 86 of reduced diameter. An external groove 88 is provided in the portion 86 adjacent the end 90 of the larger diameter body 85. Spaced apart notches 92, 94, 96 are provided in the face of the portion 86 and extend into an internal groove 89. Portions 98, 100, 102 immediately adjacent the clockwise side of the notches are coined inwardly and act as stops to prevent turning of the male element in the reverse direction and to serve as aligning devices for uncoupling of the elements.

A generally circular flat spring element 104 is received in the groove 88. The ends 106, 108 of the spring are not joined together thus permitting the spring to expand or contract. An opening 110 extends radially inwardly through the groove 88. A metal ball 112 is received in the opening 110. The forward portion of the ball 112 is normally biased by the spring 104 into the groove 89. An annular ridge 91 is provided to limit movement of the ball 112.

In operation of the device, the lugs of the male element are aligned with the notches 92, 94, 96 and the male element is inserted. When the lugs are received in the groove 89, the male element is turned in the clockwise direction until a lug engages the ball 112. Turning pressure is then applied to the male element whereupon the ball 112 will cause the spring 104 to spread apart thus permitting passage of the lug. After the lug has passed beyond the ball, the spring 104 will assume its normal position thus forcing the portion 114 of the ball back into the groove 88 and blocking reverse turning of the male element to thus securely couple the parts together. The parts may be uncoupled by manually spreading the spring 104. Alternately, a camming surface may be provided on the lugs of the male element to permit uncoupling of the device merely by turning the elements in the reverse direction.

What I claim as my invention is:

1. In a coupling comprising a male element and a female element, the male element comprising a body having at least one lug extending laterally therefrom, said lug including an angled leading face, the female element comprising a body including means defining an opening having a notch configured to receive one end of the male element with the lug received in the notch, said means having a groove therein adjacent to said opening and of larger diameter than said opening, said groove and opening defining a lip, a first movable protuberance having at least a portion extending into the groove, said means having an opening permitting movement of said protuberance out of the groove, resilient means biasing said protuberance into the groove, said first protuberance and said resilient means being integrated into a single element, said integrated protuberance and resilient means comprising a spring leg fixedly mounted at one end to the female element and with the other end being movable and biased radially inwardly whereby at least a portion thereof extends into the groove, said means defining an opening including second opening means extending axially with respect to said first mentioned opening and communicating therewith in the area of said groove, said second opening means including a portion of relatively small diameter to fixedly engage said one end of the spring leg and an enlarged portion to permit flexing of said other end of said spring leg for passage of the lug thereby, said protuberance extending into the groove a distance sufficient to make pressure contact with the lug upon insertion of the male element into the female element and relative turning of said elements whereby said angled leading face will cammingly engage said protuberance and move said protuberance against the action of the resilient means to permit passage of the lug thereby, and a second fixed protuberance in said groove spaced from the first protuberance and extending into the groove a distance sufficient to act as a stop when contacted by the lug upon further turning thereof.

2. A coupling as defined in claim 1, and further characterized in that said lug has a trailing face configured to engage said spring leg upon reverse turning of the male and female elements to prevent uncoupling of the elements.

3. A coupling as defined in claim 2, further characterized in that said spring leg has an outwardly extending hook-shaped portion for manual engagement to manually deflect the spring leg and permit uncoupling of the coupling.

4. In a coupling comprising a male element and a female element, the male element comprising a body having at least one lug extending laterally therefrom, said lug including an angled leading face, the female element comprising a body including means defining an opening having a notch configured to receive one end of the male element with the lug received in the notch, said means having a groove therein adjacent to said opening and of larger diameter than said opening, said groove and opening defining a lip, a first movable protuberance having at least a portion extending into the groove, said means defining an opening including a second radially extending opening communicating with said groove, said first movable protuberance being slidably received in said second opening, said means defining an opening including stop means to limit movement of the protuberance radially inwardly, said means defining an opening permitting movement of said protuberance out of the groove, resilient means biasing said protuberance into the groove, said protuberance extending into the groove a distance sufficient to make pressure contact with the lug upon insertion of the male element into the female element and relative turning of said elements whereby said angled leading face will cammingly engage said protuberance and move said protuberance against the action of the resilient means to permit passage of the lug thereby, and a second fixed protuberance in said groove spaced from the first protuberance and extending into the groove a distance sufficient to act as a stop when contacted by the lug upon further turning thereof.

5. A coupling as defined in claim 4, further characterized in that said second opening means extends entirely through said means defining an opening, an annular spring element secured around said means defining an opening with a portion thereof in pressure engagement with said first protuberance biasing said first protuberance radially inwardly, said annular spring being bifurcated whereby it will spread apart upon radially outward pressure applied via said first protuberance to permit passage of said lug by said first protuberance.

References Cited

UNITED STATES PATENTS

| | | | |
|---|---|---|---|
| 935,082 | 9/1909 | Anderson | 285—88 |
| 732,487 | 6/1903 | Wischermann et al. | 285—360 X |
| 1,029,819 | 6/1912 | Nylander | 285—88 |
| 1,038,840 | 9/1912 | Brookfield | 285—87 |
| 1,038,948 | 9/1912 | Patrick | 285—87 |
| 1,490,771 | 4/1924 | Fortin et al. | 285—85 |
| 2,884,981 | 5/1959 | Wurzburger | 285—91 X |
| 3,356,390 | 12/1967 | Dahlgren et al. | 285—81 X |

FOREIGN PATENTS

| | | | |
|---|---|---|---|
| 1,095,006 | 12/1954 | France | 285—376 |

DAVID J. WILLIAMOWSKY, Primary Examiner

W. L. SHEDD, Assistant Examiner

U.S. Cl. X.R.
285—91, 361, 376